March 15, 1960 G. TREDWELL 2,928,356
CONVEYOR SYSTEMS
Filed June 4, 1956 2 Sheets-Sheet 2
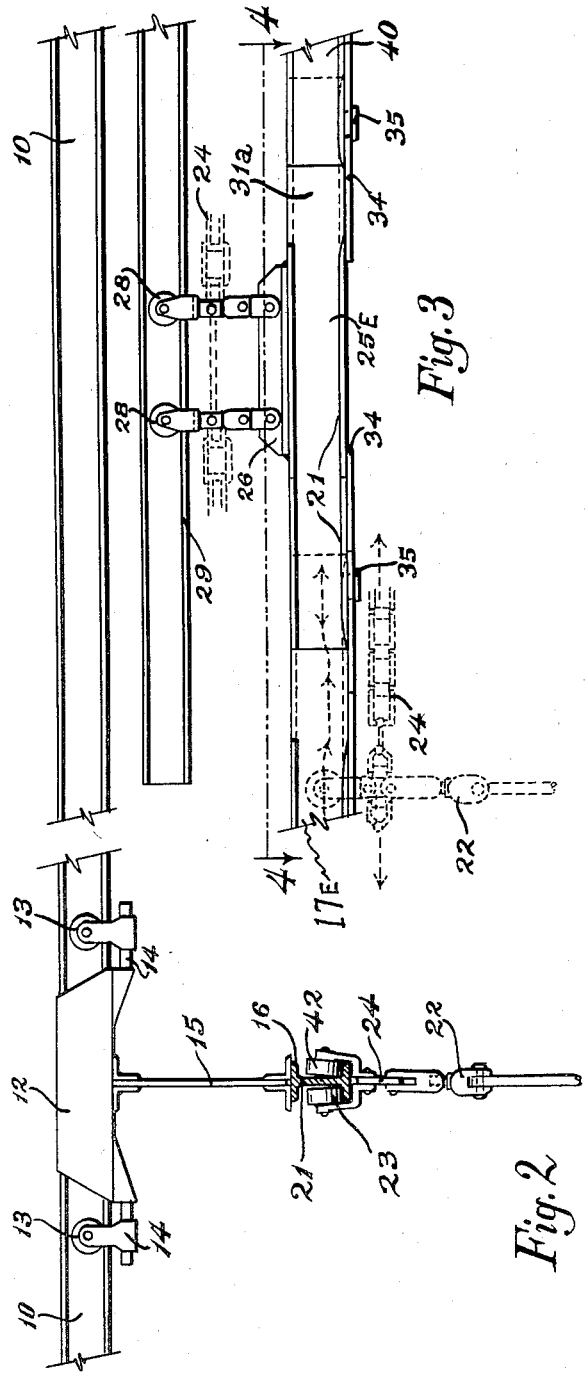
INVENTOR.
Gilman Tredwell
BY John F. Brezina
Att'y

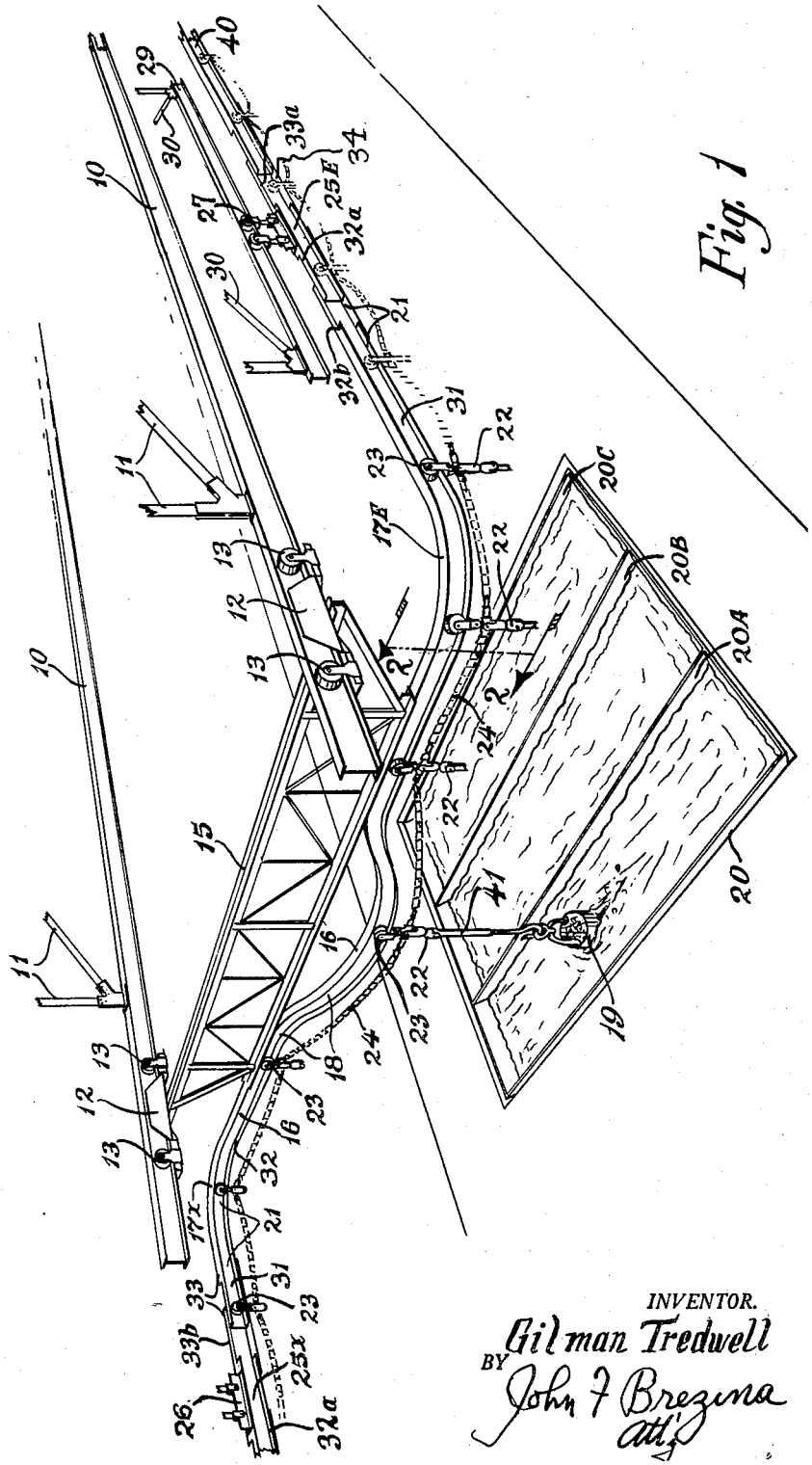

United States Patent Office 2,928,356
Patented Mar. 15, 1960

2,928,356
CONVEYOR SYSTEMS
Gilman Tredwell, Evansville, Ind., assignor to George Koch Sons, Inc., a corporation of Indiana
Application June 4, 1956, Serial No. 589,086
10 Claims. (Cl. 104—89)

This invention relates to conveyor systems. Particularly it relates to conveyor or carrier systems in which the path of the work can be varied by adjustment of the trackway.

Conventionally, adjustable conveyor systems fall within two broad categories. The first of these categories is defined by apparatus having a complete fixed track layout defining each path the work or article being processed or carried can take. The work is directed from path to path by means of track switches much like that found in a railroad switching yard. The second broad category is characterized by those conveyor systems in which adjustments can be made in a linear path because an uppermost trackway, or bridge crane, supports and defines the path for a lower trackway for longitudinal movement of such lower trackway. In the latter category the lower trackway may define a closed fixed path for the work.

In the switch type conveyor systems it is necessary to provide an extensive fixed track layout for each path that the work will be required to take in the course of its processing. In addition, if the switches are to be automatically operable an extensive electrical switching control system is required.

In the second category, hereinbefore defined, there is a requirement that the entire lower trackway defining the path of the work must be moved from place to place each time adjustment is required. Particularly characterized, the work is first loaded on a conveyor mounted along the lower trackway. To adjust the path the work will take, the entire lower trackway must be moved through a path defined by the upper trackway. When the processing of the work is finished, the lower trackway must be moved to an unloading position where the work is removed.

In accordance with the instant invention there is provided a conveyor system having a trackway and a conveyor adapted to have a fixed general or primary path and having an intermediate portion or portions thereof movable from position to position.

It is an additional object of the instant invention to provide a conveyor system having a trackway of constant length, only intermediate portions of which are movable from place to place and in which the conveyor is of fixed length.

It is an additional object of this invention to provide a conveyor system having a work carrying track or trackway of constant length and having simultaneously expansible and contractible rail sections whereby an intermediate portion of the track may be moved within the range of expansibility and contractibility of the movable track sections without varying the overall length of the track or the conveyor.

It is still a further object of this invention to provide a conveyor system comprising trackway and conveyor and having an adjustable medial section movable from position to position by virtue of opposed telescopic sections forming part of the conveyor trackway.

Other and further objects of the invention will become apparent from the following description and appended claims reference being had to the accompanying drawing and numerals of reference thereon.

On the drawings: Fig. 1 is a perspective view of a segment of a conveyor system illustrating one embodiment of the invention. Fig. 2 is a transverse sectional view taken substantially on the line 2—2 of Fig. 1 and looking in the direction of the arrows. Fig. 3 is a side elevational view of an expansion or telescoping joint section by virtue of which the adjustable medial track section may be adjusted. Fig. 4 is a view taken substantially on the line 4—4 of Fig. 3 and looking in the direction of the arrows.

Fig. 5 is a top plan view of a plurality of adjacent telescoping joints.

Referring now more particularly to the drawings there is disclosed in Fig. 1 a segment of a conveyor system which includes a preferably continuous trackway generally designated as 21. The trackway 21 herein illustrated is shown as being of I-beam construction. However, it is intended that there be no limitation to the I-beam shape or cross-sectional construction of the trackway, and that any suitable or equivalent construction for carrying a conveyor will be satisfactory provided that the same has telescopic sections for the general purpose hereinafter to become apparent.

As illustrated in the drawings, the vertical web portions of the I-beams forming trackway 21 are identified generally as 31, and the horizontal flanges disposed to one side of webs 31 are generally designated by the numeral 32 and those disposed to the other side of the webs 31 are generally designated by the numeral 33.

The trackway 21 comprises a plurality of track sections including a medial track section 16. It also includes one or more pairs of parallel telescopic track sections each of which is generally designated by the numeral 25 and which are referred to herein as floating rails. A pair of fixed opposed track sections 40, only one of which is shown, provide the end limits or anchors with respect to which adjustment is made.

The fixed track sections 40 in the embodiment of the invention described herein are spaced, parallel and coplanar, with adjacent ends spaced longitudinally of the trackway 21.

The floating rails 25 of each pair are disposed in opposed relationship, one 25-E being beyond the inlet or entry end of the medial section 16 and the other 25-X being beyond the exit or outlet end of the medial section 16.

As illustrated in Figs. 1, 2 and 3, a pair of tracks or rails 10, only one of which is seen in Figs. 2 and 3, are suitably supported from the ceiling or some suitable superstructure (not shown) by means of hangers or the like 11. The tracks 10 may be parallel I-beams Rails 10 are disposed in parallel alignment and they support a pair of opposed trucks 12. Each truck is movable along a respective track 10 on wheels 13 connected on opposite end portions 14 of each of the trucks 12.

A transversely extending carrier such as truss 15, has its opposite ends suitably rigidly secured to the opposed trucks 12 as illustrated in the drawings. Accordingly, truss 15 may be moved in the linear path defined by the rails 10.

The truss 15 has rigidly secured thereto, by means of welding or riveting or equivalent means, the medial track section 16. Medial track section has oppositely turned or bent end portions 17-E and 17-X, that preferably lie in vertical planes parallel to each other.

The medial rail section 16 is shown as having a dip or bend 18 which is not critical insofar as the instant disclosure is concerned. However, the same is provided for the purpose of illustration. As desired, the medial section 16 may be moved longitudinally in a path defined by rails 10 so that the work 19 being carried on the trackway 21 can be dipped into selected of the compartments 20A, 20B, or 20C of tank 20.

Of course, the dip tanks 20A, 20B and 20C are each only illustrative of one of a plurality of stations to which the medial rail section 16 may be moved to perform a selected operation or step in a process; and it will be appreciated that the stations represented by the dip tanks may be widely separated as long as they are within the limits of the longitudinal adjustability of medial rail section 16.

As illustrated in Fig. 1, a plurality of spaced ware hangers 22 are driven along trackway 21 by means of a conveyor 24, such as a driven link chain or the like. The conveyor 24 is preferably endless and is mounted along the trackway 21. A trolley 23 is provided for each ware hanger 22; and as illustrated in Fig. 2, the wheels 42 of each trolley ride in trackway 21. Conveyor 24 is operably connected to the trolleys 23 and ware hangers 22 and connects each ware hanger to its respective trolley. To support the work 19 such as shown in the drawings an elongated hook or auxiliary hanger 41 may be employed, as illustrated in Fig. 1.

The medial track section 16 is adjustable with respect to the fixed sections 40 of trackway 21 because at least one floating or telescopic rail section 25 is provided beyond each end of the medial section 16. Each telescopic or floating rail section 25 has rigidly secured to the top thereof a truck 26 as illustrated in Figs. 3 and 4. Each truck 26, and accordingly the associated floating rail 25, is carried by a pair of trolleys 27, the wheels 28 of which ride on one of a pair of rails 29, only one of which is shown in Fig. 1.

The rails 29 are disposed in parallel planes in opposed positions one beyond the inlet end and one beyond the outlet end of medial track section 16, whereby expanding and contracting of the floating rails 25 is in a direction which is parallel to the path of movement of the truss 15 and rail section 16. Each of the rails 29 is suitably supported by means of hangers or the like 30 rigidly secured to a ceiling or superstructure (not shown). Because of the aforedescribed construction, the truss 15 is adjustable in a path parallel to the planes in which the adjustable rail sections 25 are disposed. However, it is not necessary that rail section 16 be perpendicular to said rail sections 25, as the construction is operable, regardless of the angular disposition of section 16, as long as the path of movement thereof is parallel to planes in which the sections 25 are disposed.

To permit adjusting movement of trackway 21, which for example has only one pair of floating rails 25, an end section of the upper and the lower flanges 33a of floating rail 25E and floating rail 25X is removed and the diametrically opposite portion of the upper and lower flanges 32a is removed down to the web 31a. The intermediate portions of the flanges 32a and 33a lying between the removed portions thereof remain intact and provide the mounting for the respective trucks 26, as illustrated in the drawings. So that the medial track section 16 may be telescopically adjusted, a length of parallel flanges 32b on the end 17E, equivalent to the length of flanges 33a removed from the adjacent floating rail 25E, is cut away down to the web 31b from one end of the medial section 16. At the opposite end 17X of section 16, a length of flanges 33b is removed equal to the length of flanges 32a removed from the adjacent floating rail 25X. Such arrangement will permit sliding engagement of webs 31a and 31b, and limit contracting movement between floating rail 25E and the medial track section 16 by engagement of the cut edges of flanges 33a and 32b with the adjacent uncut edges of flanges 33b and 32a, respectively, and will limit contracting movement between section 16 and floating rail 25X in opposite direction by engagement of the opposite cut flange edges and flanges.

Further telescopic action is also achieved at the opposite outer end of each floating rail or telescopic track sections of each opposed pair by an equivalent construction in which flange portions 33c of the adjacent trackway 21 portion, herein illustrated in Figs. 1, 3 and 4 as section 40, are cut away and flanges 32c are retained intact to accommodate the relative sliding movement at said opposite end of the floating rail or telescopic section.

For proper aligned relative movement of each telescopic or floating rail section 25 and its adjacent trackway 21 sections, a support plate 34 is mounted below the trackway across each joint. Said plate is retained by means of a lug or stud 35 having an enlarged head extending beyond the plate 34. The plate 34 has an elongated slot 36 as illustrated in Fig. 4 through which said lug extends whereby the relative opening movement of the adjacent trackway sections is guided and limited.

Now then, it becomes apparent that as the truss 15 is moved to carry medial track section 16 in its longitudinal path between the rails 10, for example, to the right with respect to Fig. 1, contracting action will occur on the floating rail section 25E because of the afore-described construction. On the opposite side of the track 16 an extending or expanding action will occur. The contracting and extending or expanding action is referred to herein as telescopic. However, it will be seen that regardless of the movement of the medial section either to the right or to the left with respect to Fig. 1 the all-over length of the trackway 21 remains constant because the cut away flange portions on each floating rail of a pair, each end 17 and each section 40, is of equal length.

The foregoing arrangement provides for a continuous conveying of work from one end of the trackway 21 to the opposite end of the trackway 21 and permits for a pathway of constant length the disposition of which can be changed in part whereby work 19 being carried or conveyed by the conveyor 24 can be processed in different manners.

Obviously, as many floating rail or telescoping sections 25 as desired may be employed, provided that an equal number is used between the opposite fixed end sections 40 and the opposite ends 17 of the medial track section 16. In Fig. 5, a plurality of such sections 25 operably connected to and between one end portion 17 and its respective fixed sections 40 is illustrated.

It is seen that the contraction movement will be limited to substantially the combined lengths of the intact medial portions 37 of the floating rails 25 beyond either end 17 of medial track section 16. On the other hand, the extension is limited to the combined effect of all of the slots 36 beyond either ends 17.

Prior adjustable conveyor systems employing an endless conveyor driven along a trackway appear to be limited to the batch method of processing because the complete work carrying structure must be moved from position to position. In accordance with the instant invention the trackway defines a generally fixed basic or primary path having intermediate adjustable portions whereby work being processed may be loaded from a fixed position and may be removed at a fixed position, for example, regardless of the variation in the processing required. In other words, after processing it is not necessary to carry the trackway back to the loading position in order to unload and reload the same.

As many changes could be made in the above construction, and as many apparently widely different claims could be constructed without departing from the spirit and scope thereof, it is intended that all matter contained in the accompanying specification shall be interpreted as illustrative and not in a limiting sense.

I claim:

1. A conveyor system having a trackway and a conveyor mounted along said trackway and being characterized by a pair of laterally spaced fixed track portions with adjacent ends spaced longitudinally of said trackway and a movable track section with its ends operably secured to said fixed track portions; a carrier; means for guiding said carrier, said movable track section being secured to said carrier and being adapted to be moved between the adjacent ends of the fixed track portions of said trackway, a section of said trackway being telescopically and continuously secured to each end of said movable section and means including a pair of parallel tracks for guiding the movement of said telescoping track sections in the same direction as the direction of movement of said movable track section.

2. A conveyor system comprising a trackway and a conveyor mounted along said trackway; said trackway having fixed track sections, said fixed track sections being parallel, coplanar and spaced laterally of one another, and having adjacent ends spaced longitudinally of said trackway; a medial track section disposed substantially transversely of said fixed track sections and having oppositely extending bent ends; a pair of telescopic track sections fixed to the respective adjacent ends of the fixed track sections and the bent ends of said medial track section, said medial track section and telescopic track sections being coplanar with the fixed track sections, whereupon movement of said medial track section the length of the trackway remains constant.

3. A conveyor system comprising a trackway and a conveyor mounted on said trackway and being adapted to carry a workload along said trackway; said trackway having fixed portions disposed in coplanar relationship and spaced laterally of one another with the adjacent ends of said fixed portions spaced longitudinally of said trackway, a pair of telescopic track sections secured to said fixed portions and spaced longitudinally of said trackway, and a medial track section, the ends of said medial track section bent to extend in opposite directions and rigidly and operably secured to said telescopic track sections, and means for guiding movement of the medial track section longitudinally of said fixed portions whereupon movement of said medial track section one of said telescopic track sections expands and the other thereof contracts.

4. A conveyor system comprising a trackway and a conveyor mounted on said trackway, said trackway being of normally constant length and having fixed portions laterally spaced from and parallel to each other with adjacent ends thereof spaced longitudinally of said trackway, said trackway having a track section disposed medially of and substantially transversely to said fixed portions, said track section having opposed oppositely bent end portions; means for guiding said track section in longitudinal movement between said fixed portions; an expansion track section and a contraction track section movably secured to the respective bent end portions of said track section and being movable in a path parallel to the path of movement of said track section, and means for guiding the movement of said expansion and contraction track sections.

5. A conveyor system having a trackway and a conveyor disposed on said trackway and characterized by a pair of fixed portions disposed parallel to each other with adjacent ends spaced longitudinally of one another, a pair of opposed telescopically mounted track sections operably connected to the adjacent ends of said fixed portions and extending in opposite directions, a longitudinally movable medial track section, the opposite ends of said medial track section operably secured to said telescopically mounted track sections, said medial track section disposed substantially transversely of said fixed portions, means, including a carrier and rails, for moving said medial track section, and rail means for supporting said telescopically mounted track sections, said rails and rail means being disposed in parallel planes.

6. A movable medial track section having opposite ends bent in opposite directions; a pair of parallel telescoping track sections rigidly connected to the opposite ends of said medial track section, the sections of said telescoping track respectively contracting and expanding simultaneously; means including a pair of parallel rails for guiding the movement of said telescoping track sections in paths parallel to the path of movement of said medial track section; a pair of fixed track sections fixed in coplanar, parallel position and having opposite adjacent ends spaced longitudinally and connected to said telescoping track sections respectively; means operably connected to said medial track section for guiding the movement of said medial track section in a path parallel to said fixed track sections, and an endless conveyor of normally constant length mounted on the trackway formed by said track sections.

7. A conveyor system comprising two pairs of parallel rails, a carrier movably mounted on and transversely disposed between one pair of said rails; a floating track section operably mounted on each rail of the other pair of rails, each floating track section having opposite telescoping ends; a medial track section including telescopic components at its opposite end portions telescopically connected at its opposite ends to both floating track sections and being secured to said carrier; and a pair of fixed track sections spaced longitudinally from and parallel to each other, each thereof being telescopically connected to one of said floating track sections, said track sections comprising a trackway, and an endless conveyor of substantially constant length mounted on the trackway.

8. A conveyor system comprising a trackway of normally constant length; an endless conveyor of normally constant length mounted on said trackway and being adapted to carry a workload in a path defined by said trackway, a medial portion of said trackway having curved opposite end portions extending in opposite directions and telescopic components at the end portions of said medial portion; portions of said trackway beyond the opposite ends of said medial trackway portion comprising telescoping track sections operably connected to said telescopic components; two pairs of parallel rails, one pair of said rails supporting and defining the path of movement of said medial portion of said trackway, and the other pair of said rails supporting said telescoping track sections.

9. A conveyor system comprising a trackway and a conveyor mounted on said trackway and characterized by a pair of fixed, laterally spaced, parallel track sections with adjacent ends spaced longitudinally of said trackway, a connecting track section disposed substantially transversely between said fixed track sections, the ends of said connecting track section bent to extend in opposite directions, a pair of telescopic track sections, each thereof connected to one of said adjacent ends and one end of said connecting track section, and means supporting the connecting track section for movement toward one fixed track section and away from the other while retaining the length of the trackway constant.

10. A conveyor system comprising a trackway and a conveyor mounted on said trackway; said trackway having fixed track sections, said fixed track sections being parallel, coplanar and spaced laterally of one another, and having adjacent ends spaced longitudinally of said trackway; a medial track section disposed substantially transversely of said fixed track sections and having oppositely extending bent ends; a pair of telescopic track sections fixed to the respective adjacent ends of the fixed track sections and the bent ends of said medial track section, said medial track section and telescopic track sections being coplanar with the fixed track sections, whereupon movement of said medial track section the length of the trackway remains constant.

References Cited in the file of this patent

UNITED STATES PATENTS

| 1,389,545 | Click | Aug. 30, 1921 |
| 1,785,315 | Kennedy | Dec. 16, 1930 |
| 1,804,272 | Palmer | May 5, 1932 |
| 1,875,535 | Whitney | Sept. 6, 1932 |
| 1,876,373 | Whitney | Sept. 6, 1932 |
| 2,371,907 | Moore et al. | Mar. 20, 1945 |

FOREIGN PATENTS

| 586,525 | France | Jan. 6, 1925 |